US010523811B2

(12) United States Patent
Moon

(10) Patent No.: US 10,523,811 B2
(45) Date of Patent: Dec. 31, 2019

(54) RING-BACK TONE SETTING METHOD, RING-BACK TONE SERVICE SYSTEM AND RING-BACK TONE PLAYING METHOD

(71) Applicant: VIMIO INC., Englewood, NJ (US)

(72) Inventor: Bongjae Moon, Seoul (KR)

(73) Assignee: VIMIO INC., Englewood, NJ (US)

( * ) Notice: Subject to any disclaimer, the term of this patent is extended or adjusted under 35 U.S.C. 154(b) by 0 days.

(21) Appl. No.: 15/551,218

(22) PCT Filed: Sep. 2, 2016

(86) PCT No.: PCT/US2016/050129
§ 371 (c)(1),
(2) Date: Aug. 15, 2017

(87) PCT Pub. No.: WO2017/008088
PCT Pub. Date: Jan. 12, 2017

(65) Prior Publication Data
US 2018/0109674 A1    Apr. 19, 2018

(30) Foreign Application Priority Data
Jul. 3, 2015    (KR) .................. 10-2015-0095037

(51) Int. Cl.
*H04M 3/42*    (2006.01)
*H04W 4/16*    (2009.01)
(Continued)

(52) U.S. Cl.
CPC ......... *H04M 3/42017* (2013.01); *H04W 4/12* (2013.01); *H04W 4/16* (2013.01);
(Continued)

(58) Field of Classification Search
CPC .... H04M 3/436; H04M 3/42017; H04M 3/02; H04M 19/041
(Continued)

(56) References Cited

U.S. PATENT DOCUMENTS 7,995,728 B1 *  8/2011  Martin .............. H04M 3/42017
                                              379/201.02
8,325,887 B2 * 12/2012  Noldus ............ H04M 3/42017
                                              348/14.01
2007/0116251 A1 *  5/2007  Seo ...................... H04M 1/253
                                              379/372
2008/0037740 A1 *  2/2008  Yoakum ............ H04M 3/42017
                                              379/142.01
(Continued)

FOREIGN PATENT DOCUMENTS

KR    20050019347    3/2005
KR    20060041449    5/2006
(Continued)

OTHER PUBLICATIONS

International Search Report—PCT/US2016/050129 dated Nov. 29, 2016.

*Primary Examiner* — Ahmad F. Matar
*Assistant Examiner* — Rasha AlAubaidi
(74) *Attorney, Agent, or Firm* — Cantor Colburn LLP

(57) ABSTRACT

Provided is a method for setting a ring-back tone played while a second wireless communication terminal attempts to make a call to a first wireless communication terminal. The first wireless communication terminal selects a sound source to be used as a ring-back tone, and selects the second wireless communication terminal in which the sound source is to be set. According to a request of the first wireless communication terminal, a message is transmitted to the second wireless communication terminal. The message is displayed on a screen of the second wireless communication terminal. The second wireless communication terminal downloads the sound source contained in the message or downloads the sound source from a pre-determined server connected to the second wireless communication terminal through a URL. The second wireless communication terminal sets the downloaded sound source to a ring-back tone played while the second wireless communication terminal (Continued)

attempts to make a call to the first wireless communication terminal.

12 Claims, 15 Drawing Sheets

(51) Int. Cl.
*H04W 80/12* (2009.01)
*H04W 4/12* (2009.01)

(52) U.S. Cl.
CPC ........ *H04W 80/12* (2013.01); *H04M 3/42136* (2013.01); *H04M 3/42161* (2013.01)

(58) Field of Classification Search
USPC .......................... 379/201.01–201.05, 207.16
See application file for complete search history.

(56) References Cited

U.S. PATENT DOCUMENTS

| | | | |
|---|---|---|---|
| 2009/0098891 A1 | 4/2009 | Park et al. | |
| 2011/0150203 A1* | 6/2011 | Stille .................. | H04M 3/42017 |
| | | | 379/207.16 |
| 2012/0053938 A1* | 3/2012 | Trivi .................. | H04M 3/53366 |
| | | | 704/235 |
| 2012/0076289 A1* | 3/2012 | Mutya ............... | H04M 3/42017 |
| | | | 379/207.16 |
| 2016/0227027 A1* | 8/2016 | Lee ......................... | H04M 1/57 |

FOREIGN PATENT DOCUMENTS

| | | |
|---|---|---|
| KR | 20060068155 | 6/2006 |
| KR | 20070105471 | 10/2007 |
| KR | 20080091571 | 10/2008 |
| KR | 20090019091 | 2/2009 |

\* cited by examiner

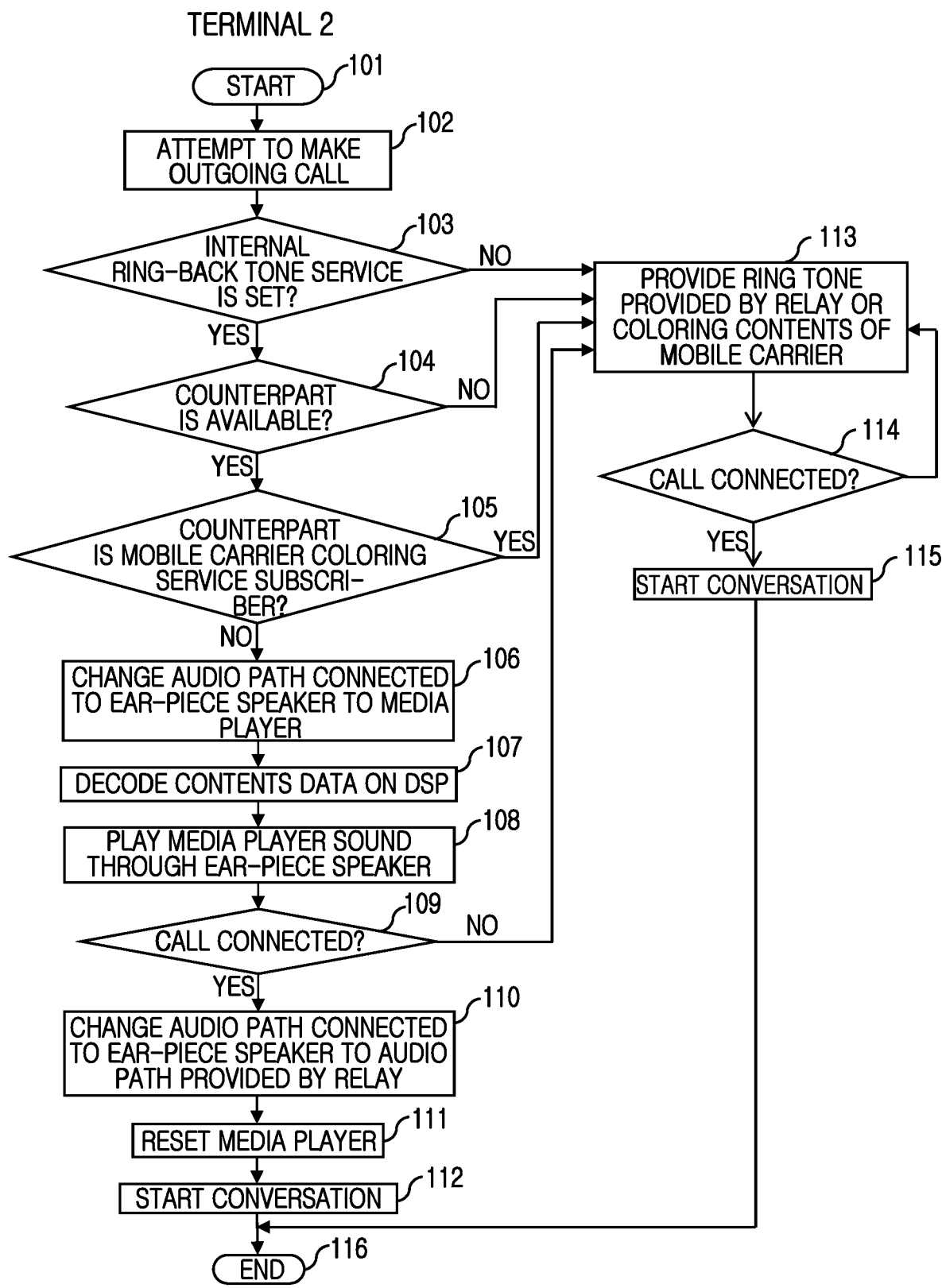

RING-BACK TONE SETTING METHOD, RING-BACK TONE SERVICE SYSTEM AND RING-BACK TONE PLAYING METHOD

TECHNICAL FIELD

The present invention relates to a method for providing and setting a ring-back tone service in a smart phone.

BACKGROUND ART

Recently, with the development of smart phone-related technology, smart phones have developed to such an extent that the functions and performances thereof compare with those of existing PCs. Thus, it is time to review the relay-based ring-back tone service which was created at the time of 2G phones. The 2G phones had provided the circuit-based voice service instead of the packet-based data service, and the ring-back tone service had been developed at that time. The ring-back tone service is still being used while a large number of mobile-carrier relays directly play contents and provide the contents to mobile terminals through circuit networks.

The packet-based service and the circuit-based service will be briefly described as follows. When communication is intended to be connected between points A and B, the connection passes through a plurality of gateways/routers. Thus, between the points A and B, a plurality of paths may be created depending on combinations. According to the circuit-based service, a path is selected from the plurality of paths when communication is initially connected, and continuously used until the communication is disconnected. In this case, since one path is completely occupied while the path is used, a user bears a communication fee for the path occupation. According to the packet-based service, data are divided into a predetermined size of units (packets), and the packets are transmitted to the destination through different paths and recombined in the original order. The packet-based service has advantages in that data can be transmitted without occupying a predetermined path and a communication fee is determined according to how many packets are transmitted. A representative example of the circuit-based service is the current voice call connection method, and the packet-based service is mainly used for data communication.

The circuit-based service is technically based on the principle that, when music is played from one telephone after two telephones are connected to each other, the music is heard through the other telephone. Such a service is still provided even at this moment that smart phones have been popularized. In the circuit-based service, although high-quality music is played, the sound quality of the music is determined only within a voice call bandwidth. Thus, although recent high-quality MP3 sound sources and high-quality lossless contents are provided, the contents are inevitably serviced according to a narrow bandwidth provided by the circuit network.

Furthermore, when a user sets a ring-back tone under the current service, all persons who make a call to the user must hear the set contents regardless of their intentions. Therefore, all persons inevitably hear the corresponding contents until the call is connected.

DISCLOSURE

Technical Problem

The related art has the following problems.

The existing ring-back tone (coloring) service can be operated only by mobile carriers, and is provided through a transmission architecture which plays music contents through a telephone service network and relays.

Specifically, the mobile carriers produce music contents, upload the music contents to dedicated servers in mobile carrier networks operated by the mobile carriers, and play and transmit the contents to subscribed users through in-network servers.

The ring-back tone (coloring) service provided through such an architecture requires a fixed monthly fee of 900 Won (surtax excluded), and separately charges users with the cost of contents such as settable music.

As of 2015, the entire 12.5 million subscribers including 6.3 million subscribers of SK Telecom use the service. They pay a basic monthly fee of 900 Won to the mobile carriers, and separately pay for contents whenever contents are changed (average of 880 Won per sound source).

Since settable contents are also operated by the mobile carriers, only contents registered in the mobile carrier servers can be distributed. Furthermore, contents can be provided only by a company designated by the mobile carriers (for example, Real Networks in Korea).

For example, although an indie band has a good song, the song cannot be used as a coloring sound as long as the corresponding contents do no exist in the servers operated by the mobile carriers.

That is, the related art has the following problems: (1) since contents are transmitted through a voice network, a high-quality sound source service cannot be provided, (2) all users must pay a fixed monthly fee of 900 Won to use the service, (3) a user cannot register a sound source owned by the user and can set only contents provided by the company, (4) users must hear music for call connection, and (5) in order to set a sound source secured through another service to a ring-back tone, users must buy the same contents.

Simply, an approach to a method of bringing contents data to a packet network with a slight time difference from a call connection attempt may be considered. However, since the speed and bandwidth of the data network are changed from time to time, it is difficult to have reliability at such a level that contents data can be safely secured for a short moment during which call connection is attempted. Thus, unless the reliability is guaranteed, the service cannot be used as a commercial service. Furthermore, according to some test results, each terminal AP has different performance, and Qualcomm chips which are generally used do not guarantee a priority to another attempt during call connection and an execution of a thread corresponding to the attempt, which means that it is impossible to have the reliability required by actual commercial services. Moreover, call connection may be delayed in such an approach.

This is because a problem occurs in a resource allocating process, and the problem may occur when a data loss is significantly high. That is, when a coloring service (ring-back tone service) is attempted through the packet communication (for example, LTE) at the same time while call connection is attempted through the circuit communication (for example, the 2G or 3G communication), the efficiency is too low even though the attempt is not impossible. Furthermore, since the attempt imposes a heavy burden on the communication in a situation that all resources are focused on the call connection, the call connection may not be smoothly performed.

Technical Solution

In an embodiment, there is provided a ring-back tone setting method for setting a ring-back tone which is played while a second wireless communication terminal attempts to make a call to a first wireless communication terminal. The ring-back tone setting method may include the steps of: (1) selecting, by the first wireless communication terminal, a sound source to be used as a ring-back tone, and selecting the second wireless communication terminal in which the sound source is to be set; (2) transmitting a message to the second wireless communication terminal according to a request of the first wireless communication terminal; (3) displaying the message on the second wireless communication terminal; (4) downloading, by the second wireless communication terminal, the sound source contained in the message, or downloading the sound source from a predetermined server connected to the second wireless communication terminal through a URL; and (5) setting, by the second wireless communication terminal, the downloaded sound source to a ring-back tone which is played while the second wireless communication terminal attempts to make a call to the first wireless communication terminal.

In the step (2), the message may contain the title of the sound source and information indicating the message created by a request from the first wireless communication terminal, and include one of an SMS (Short Message Service) text, an MMS (Multimedia Message Service) text and a push message.

The step (4) may include asking a user of the second wireless communication terminal whether the user allows the downloading, before the second wireless communication terminal downloads the sound source.

In the step (1), the sound source may include contents stored in the first wireless communication terminal or a sound source selected from a ring-back tone list server.

In the step (1), when the contents stored in the first wireless communication terminal are selected as the sound sources to be used as the ring-back tone, the contents may not be directly transmitted to the second wireless communication terminal, but sound source information of the contents stored in the first wireless communication terminal may be extracted to check whether a sound source coinciding with the sound source information exists in the ring-back tone list server or a server connected to the ring-back tone list server, and the contents may be transmitted to the second wireless communication terminal from the ring-back tone list server or the connected server in case where the sound source exists.

The sound source information may contain the artist name and the title of the contents.

In another embodiment, there is provided a ring-back tone service system which is used for executing the above-described method. The ring-back tone system may acquire and store sound source data of a sound source selected by a first wireless communication terminal, transmit the sound source data to a second wireless communication terminal, and set the sound source data to a ring-back tone which is used when the second wireless communication terminal makes a call to the first wireless communication terminal.

The ring-back tone service system may include: a gateway server configured to request URL information of a server storing the selected sound source, when the sound source is selected through the ring-back tone list server in the step (1); a stream server configured to check whether the sound source is a sound source owned by the stream server, or acquire a sound source from another data server, according to a request from the gateway server; and a push server configured to send a push message to the second wireless communication terminal, the push message containing the URL of the selected sound source within the stream server.

The gateway server, the stream server and the push server may be configured as separate servers, or two or more of the gateway server, the stream server and the push server may be configured as one server.

In further another embodiment, there is provided a ring-back tone playing method in which the second wireless communication terminal having a ring-back tone set through the above-described method plays the ring-back tone while attempting to make a call to the first wireless communication terminal. The ring-back tone playing method may include the steps of: attempting, by the second wireless communication terminal, to make a call to the first wireless communication terminal; checking whether the ring-back tone is set in the second wireless communication terminal; changing an audio path connected to an ear-piece speaker of the second wireless communication terminal to an audio path passing through a media player or internal codec embedded in the second wireless communication terminal, when it is checked that the ring-back tone is set; playing sound source data through the ear-piece speaker, the sound source data being stored in the second wireless communication terminal and set to the ring-back tone; and changing the audio path connected to the ear-piece speaker to an audio path provided by a call relay, when the call to the first wireless communication terminal is connected.

The step of playing the sound source data stored in the second wireless communication terminal and set to the ring-back tone through the ear-piece speaker may include decoding and playing the sound source data stored in the second wireless communication terminal through a DSP (Digital Signal Processor).

The ring-back tone system may further include the step of: checking whether the second wireless communication terminal is a coloring service subscriber of a mobile carrier, while checking whether the ring-back tone is set in the second wireless communication terminal; changing the audio path regardless of whether the second wireless communication terminal is a coloring service subscriber when the ring-back tone has priority according to order of priority set in advance in the second wireless communication terminal; and using the coloring service of the mobile carrier when the coloring service of the mobile carrier has priority according to the order of priority set in advance in the second wireless communication terminal.

Advantageous Effects

According to the present embodiments, it is possible to provide a technique capable of setting contents provided by contents providers or contents owned by a user to a ring-back tone which is used when another user makes a call to the user. Under the current service architecture, only the contents providers (mobile carriers) can provide contents. According to the present embodiments, anyone can provide contents, and any contents can be set to a ring-back tone.

BRIEF DESCRIPTION OF DRAWINGS

FIG. 1 is a flowchart illustrating a ring-back tone playing method according to an embodiment of the present invention.

DESCRIPTION OF EMBODIMENTS

Figure 2A:
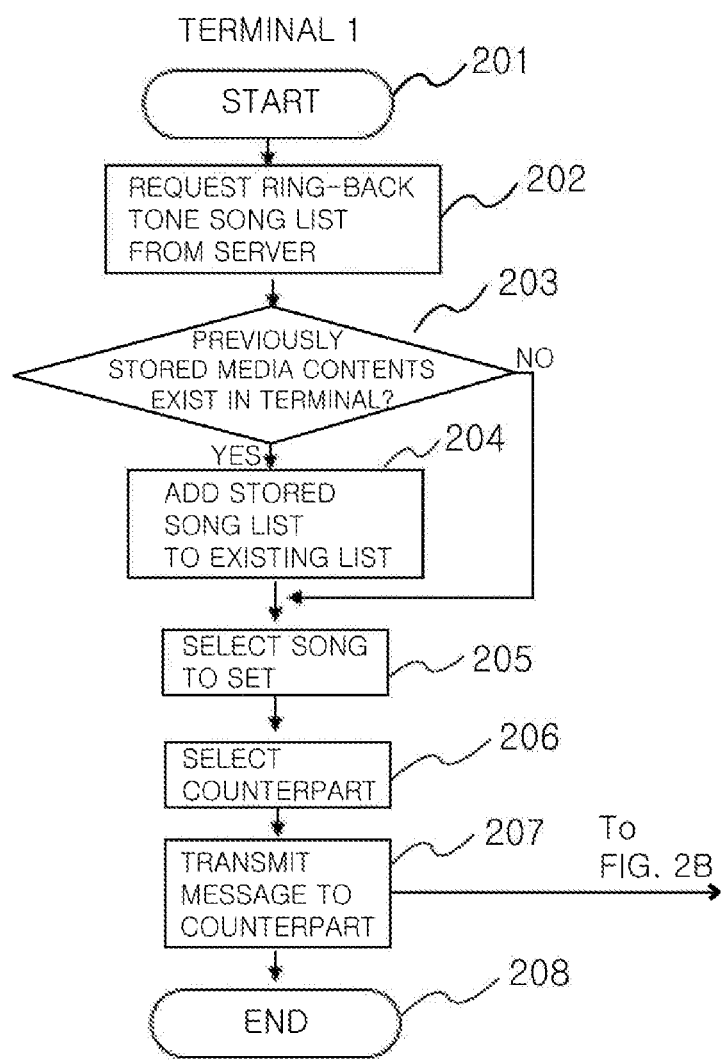
FIGS. 2A and 2B are flowcharts illustrating the ring-back tone setting method according to the embodiment of the present invention.

Hereafter, a system and method according to an embodiment of the present invention will be described with reference to the accompanying drawings.

FIG. 1 is a flowchart illustrating a ring-back tone playing method according to an embodiment of the present invention.

FIG. 1 exemplifies that a terminal 2 attempts to make a call to a terminal 1.

At step 102, a user attempts to make an outgoing call through the terminal 2. Then, the terminal 2 checks whether an internal ring-back tone service according to the present embodiment is set, at step 103. When the internal ring-back tone service according to the present embodiment is set, the method proceeds to step 104. Otherwise, the method proceeds to step 113. A process of setting an internal ring-back tone service according to the present embodiment will be described later in detail with reference to FIGS. 2A and 2B.

At step 104, the terminal 2 checks through a relay whether the counterpart terminal (that is, the terminal 1) is available. When the counterpart terminal is available, the method proceeds to step 105. Otherwise, the method proceeds to step 113.

At step 105, the terminal 2 checks whether the counterpart terminal (that is, the terminal 1) is a mobile-carrier coloring service subscriber, through a relay. When the counterpart terminal is not a mobile-carrier coloring service subscriber, the method proceeds to step 106, and when the counterpart terminal is a mobile-carrier coloring service subscriber, the method proceeds to step 113. FIG. 1 exemplifies that providing coloring contents of a mobile carrier has priority over providing an internal ring-back tone according to the present embodiment. However, the method can be modified in such a manner that providing an internal ring-back tone has priority over providing coloring contents of a mobile carrier.

At step 106, the terminal 2 changes an audio path connected to an ear-piece speaker to a media player or internal codec.

The ear-piece speaker refers to a speaker used for voice communication (telephone conversation). Since the ear-piece speaker converts a signal based on a voice call bandwidth into a sound, the sound quality of the ear-piece speaker is not satisfactory. However, this is not the quality problem of the speaker, but is because a signal transmitted through the speaker is a low-quality voice call signal as described above. Furthermore, since a ring tone provided through a relay or a coloring service of a mobile carrier in the related art is transmitted on a similar principle to the voice communication, the ring tone or the coloring service has a low sound quality. A user may download an MP3 sound source through a smart phone (for example, the terminal 2). In this case, when the MP3 sound source is played on the terminal 2, the MP3 sound source is heard through an outer speaker of the smart phone. The outer speaker is connected to the media player, and used for playing a high-quality source, for example, the above-described MP3 sound source. Therefore, regardless of the performances of the speakers, a low-quality sound is emitted through the ear-piece speaker, and a high-quality sound is emitted through the outer speaker connected to the media player.

In the present embodiment, however, the audio path connected to the ear-piece speaker is changed to pass through the media player, as in step 106.

At step 107, contents data stored in the terminal 2 are decoded on a DSP (Digital Signal Processor).

At step 108, a sound of the media player is played through the ear-piece speaker. That is, this indicates that the internal ring-back tone service according to the present embodiment is performed through the ear-piece speaker.

Then, when the call is connected at step 109, the audio path connected to the ear-piece speaker through the media player is changed to an audio path provided by a relay at step 110.

At step 111, the set media player is reset because the media player is not used during a voice call. At step 112, a phone call (voice call) is started.

When the check result is 'No' at any one of steps 103 to S105, the method proceeds to step 113 to provide a ring-back tone provided through the relay or coloring contents of a mobile carrier. When the call is connected at step 114, a voice call is performed. Otherwise, step 113 is repeated.

Figure 2B:
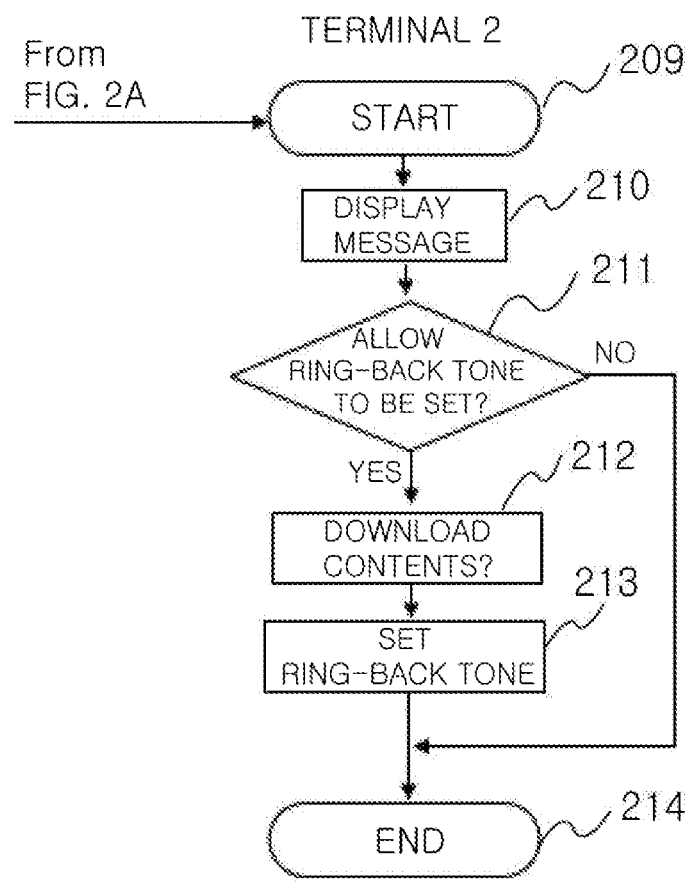

FIGS. 2A and 2B are flowcharts illustrating a ring-back tone setting method according to an embodiment of the present invention.

Hereafter, referring to FIGS. 2A and 2B, a process of previously setting an internal ring-back tone service according to the present embodiment will be described.

The terminal 1 requests a ring-back tone song list from a server at step 202. For convenience of description, a song list is exemplified in the present embodiment. However, the terminal 1 may request a list of voice comments or sound effects, instead of music.

At step 203, a user checks whether previously stored media contents exist in the terminal. When the previously stored media contents exist, the user adds the list of previously stored media contents to an existing list and then selects a song to set at steps 204 and 205. On the other hand, when no previously stored media contents exist, the user immediately selects a song to set at step 205.

At step 206, the user selects a counterpart who shall use the selected song as a ring-back tone. For example, when the telephone numbers of persons B, C and D are stored in the address book of the terminal 1 used by a person A, the person B may be set to a person who shall hear the specific song selected in the terminal 1 by the person A at step 205 as a ring-back tone when the person B (counterpart) makes a call to the person A (the owner of the terminal 1) through the terminal 2, at step 206.

At step 207, a message is transmitted to the set counterpart (person B in the above-described example). This message may include a push message. Alternatively, the message may include an SMS (Short Message Service) text or MMS (Multimedia Message Service) text. However, the push message may be used in order to call the attention of a user or freely adjust the form of the message through a separate server.

So far, the process in the terminal of the person A (that is, terminal 1) has been described. Hereafter, a process in the terminal of the person B (that is, terminal 2) will be described.

When the terminal 1 transmits a message to the set counterpart (that is, the person B using the terminal 2) at step 207, the message is embodied and displayed on the terminal 2 through a push function, for example, at step 210. The terminal 2 can select whether to allow the song selected by the terminal 1 to be set to a ring-back tone, at step 211. When the second terminal 2 allows the song to be set to a ring-back tone, the song (contents) is downloaded to the terminal 2 at step 212. Then, this song is set to the ring-back tone at step 213. On the other hand, when the terminal 2 does not allow the song selected by the terminal 1 to be set to a ring-back tone at step 212, the method is ended without passing through steps 212 and 213.

As such, when the push message requested from the terminal 1 of the person A is displayed on the terminal 2 of the person B and the person B selects "Yes" in the message saying that "Do you want to set Ring-Back-Tone with this song sent from A?", for example, the corresponding song is downloaded to the terminal 2. Afterwards, when the terminal 2 makes a call to the terminal 1, the song is used as the ring-back tone. Depending on settings, however, the ring-back tone may be set only for a call that the terminal 2 makes to the terminal 1, or set for all outgoing calls from the terminal 2.

Figure 3:
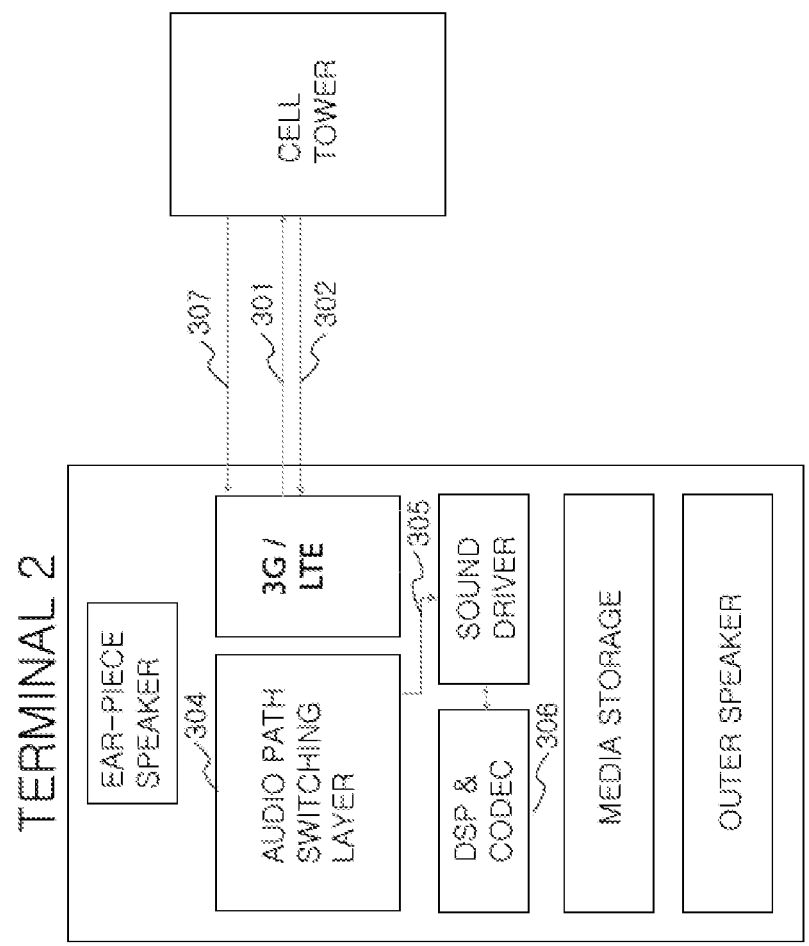
FIG. 3 is a diagram for describing a process in which a second wireless communication terminal having a ring-back tone set therein attempts to make a phone call.

FIG. 3 is a diagram illustrating a process in which the terminal 2 having a ring-back tone set therein attempts to make a phone call.

The situation in which the terminal 2 receives a push message from the terminal 1, downloads a sound source, and sets the sound source to a ring-back tone has been described above.

Hereafter, the process in which the terminal 2 attempts to make a call to the terminal 1 will be described.

Step 301: the terminal 2 attempts to make a call to the terminal 1. Step 301 is performed separately from the following steps 302 to 306 at the same time, using thread as.

Step 302: the terminal 2 checks whether the terminal 1 can receive the call (normal case), through a relay. That is, the terminal 2 receives information indicating whether the terminal 1 is not powered off or not busy. Furthermore, the terminal 2 receives information indicating whether a ring-back tone service of a mobile carrier is set.

Step 303 (not illustrated): when the terminal 1 is in a state corresponding to the normal case and does not subscribe to a ring-back tone service of a mobile carrier, the terminal 2 determines whether the contents playing service according to the present embodiment is set therein. At this time, although the terminal 1 is in a state corresponding to the normal case and has subscribed to the ring-back tone service of the mobile carrier, the terminal 2 may preferentially determine whether the contents playing service according to the present embodiment is set therein, in order to whether to provide the service. However, the setting for the priority can be changed.

Step 304: when it is determined at step 303 that the terminal 2 needs to enable the contents playing service, the terminal 2 requests a change of the audio path. Specifically, the audio path of the ear-piece speaker connected to a source which is received from a relay through a communication network such as 3G/LTE and played by a data playback decoder may be changed in order to output a source played by the DSP embedded in the terminal 2 through the ear-piece speaker.

Step 305: the terminal 2 attempts to change a sound-driver stage in order to change the audio path.

Step 306: the terminal 2 checks whether the audio path is changed to the ear-piece speaker from the outer speaker, fetches media contents stored in an internal storage space thereof to the DSP, and plays the media contents through the connected ear-piece speaker by decoding the media contents using a suitable codec.

Step 307: as soon as the terminal 1 to which the terminal 2 attempts to make the call at step 301 receives the call during steps 302 to 306, all the steps are stopped. In particular, the contents played through the DSP are stopped, all resources are canceled, and the audio path of the ear-piece speaker connected to the DSP is changed to an ear-piece end received from the relay.

The present embodiment can solve the problem that users must pay a monthly fixed fee of 900 Won in order to use the ring-back tone service (coloring service) in the related art. That is, since the service does not use a mobile carrier network, the users do not need to pay a separate fee to the mobile carrier. Furthermore, since contents stored in a terminal of a person who attempts to make a call, for example, the terminal 2 are played through the internal media player, the users do not need to pay a fee for the service.

Moreover, in the related art, users cannot register their own sound sources, and can set only contents provided by service providers. According to the present embodiment, however, the terminal 1 can send a link to the terminal 2 such that the terminal 2 can download contents, and sound sources stored in the terminal 2 can be used to set a ring-back tone.

Furthermore, according to the present embodiment, anyone can freely purchase a sound source created by a specific user through an online market in which various contents can be freely bought and sold. That is, when any user has a copyright and contents, the user may service a free market for selling the contents to make a profit, instead of the markets only for service providers focused on mobile carriers.

In the related art, although a sound source is already secured, users must repurchase the same contents in order to set the sound source to a ring-back tone. According to the present embodiment, however, since users can freely set their own contents to a ring-back tone, the users do not need to purchase the same contents.

Figure 4:
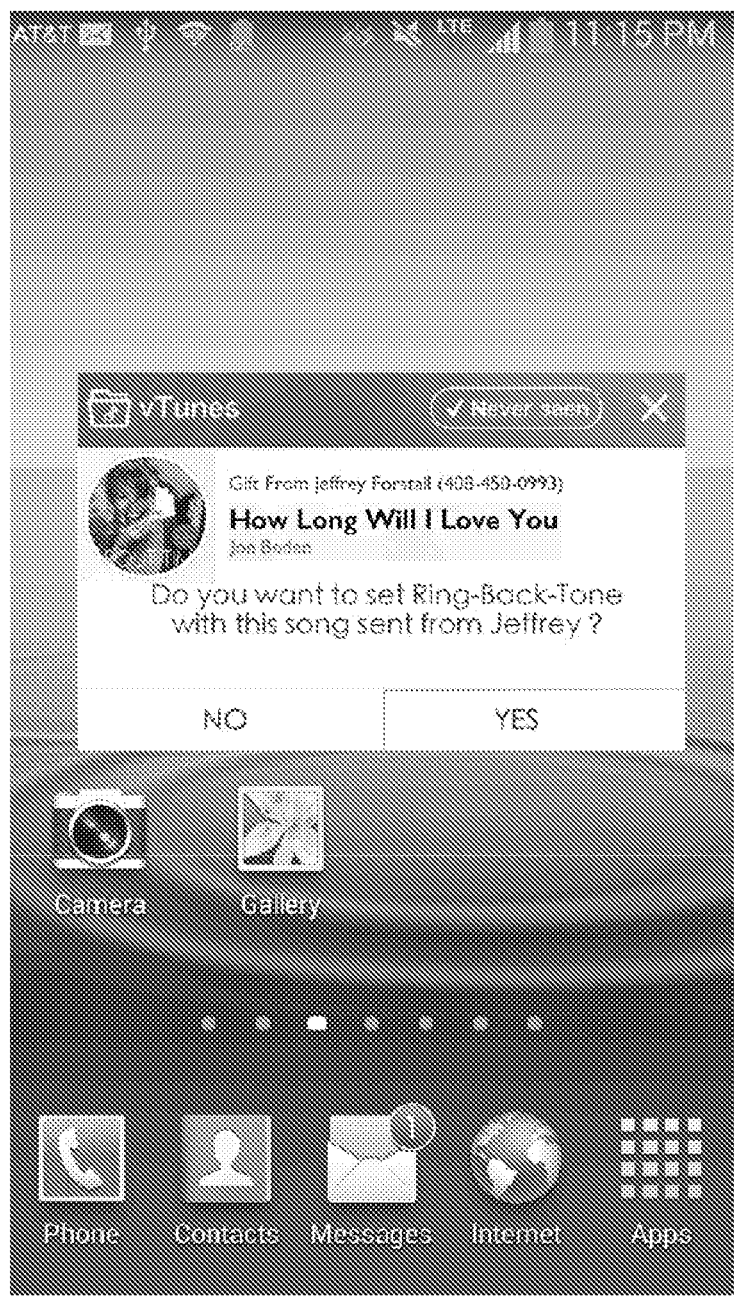
FIG. 4 shows a screen which displays a message to ask a user if the user will use a sound source selected by a counterpart user as a ring-back tone when making a call to the counterpart user.

In the related art, a user must hear music in order to make a call. That is, when a person A sets a ring-back tone in his/her terminal, all persons who make a call to the person A unconditionally hear the ring-back tone. In the present embodiment, however, when a person A wants to set a song which can be heard when a person B makes a call to the person A, a process of asking the person B "Do you want to set Ring-Back-Tone with the song ZZZ sent from A?" is performed as shown in FIG. 4. A ring-back tone is set according to the intention of the user B through such a process, and thus the service is provided in a reasonable manner. Furthermore, although contents are already set to a ring-back tone, the user B can change the contents or set an option for refusing to hear the contents during call connection.

FIG. 4 shows a screen which displays a message to ask a user if the user will use a sound source selected by a counterpart user as a ring-back tone when making a call to the counterpart user.

FIG. 4 exemplifies that Jeffery Forstall as the owner of the terminal 1 sends a song of "How long will I love you" as a ring-back tone to the user B as the owner of the terminal 2. FIG. 4 is a screen of the terminal 2 owned by the user B, illustrating that a push message is displayed on the terminal 2 according to an operation of the terminal 1 owned by Jeffrey Forstall. When the user B selects 'YES' in FIG. 4, the corresponding song is downloaded to the terminal 2 from a server and set to a ring-back tone. The song is used as the ring-back tone when the user B makes a call to Jeffrey Forstall.

FIGS. 5A to 5D are diagrams illustrating a process of selecting a ring-back tone sound source in a terminal.

The process in which a terminal 1 of a user A sends a push message saying "Do you want to set Ring-Back-Tone with the song ZZZ sent from A?" to a terminal 2 of a user B has been described above.

Referring to FIGS. 5A to 5D, a process in which the terminal 1 selects a song will be described.

Figure 5A:
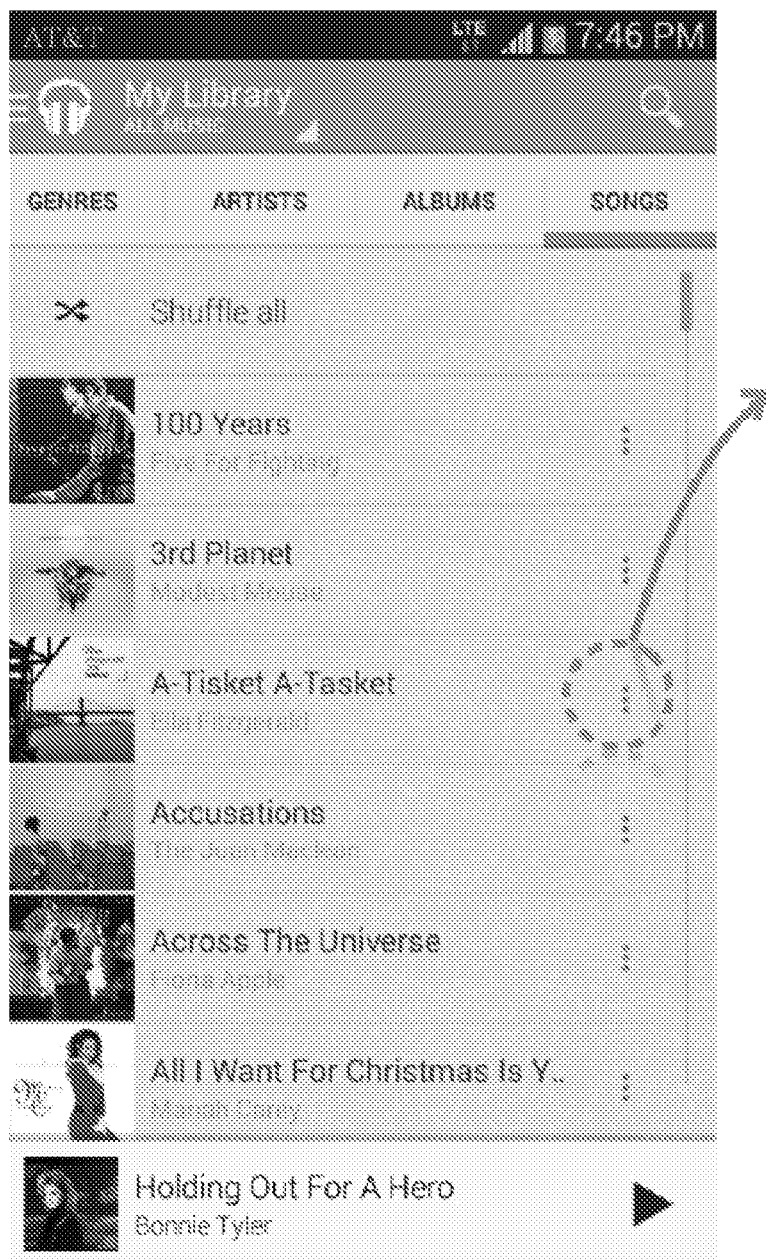
FIGS. 5A to 5D are diagrams illustrating a process in which a ring-back tone sound source is selected in a terminal.
Figure 5B:
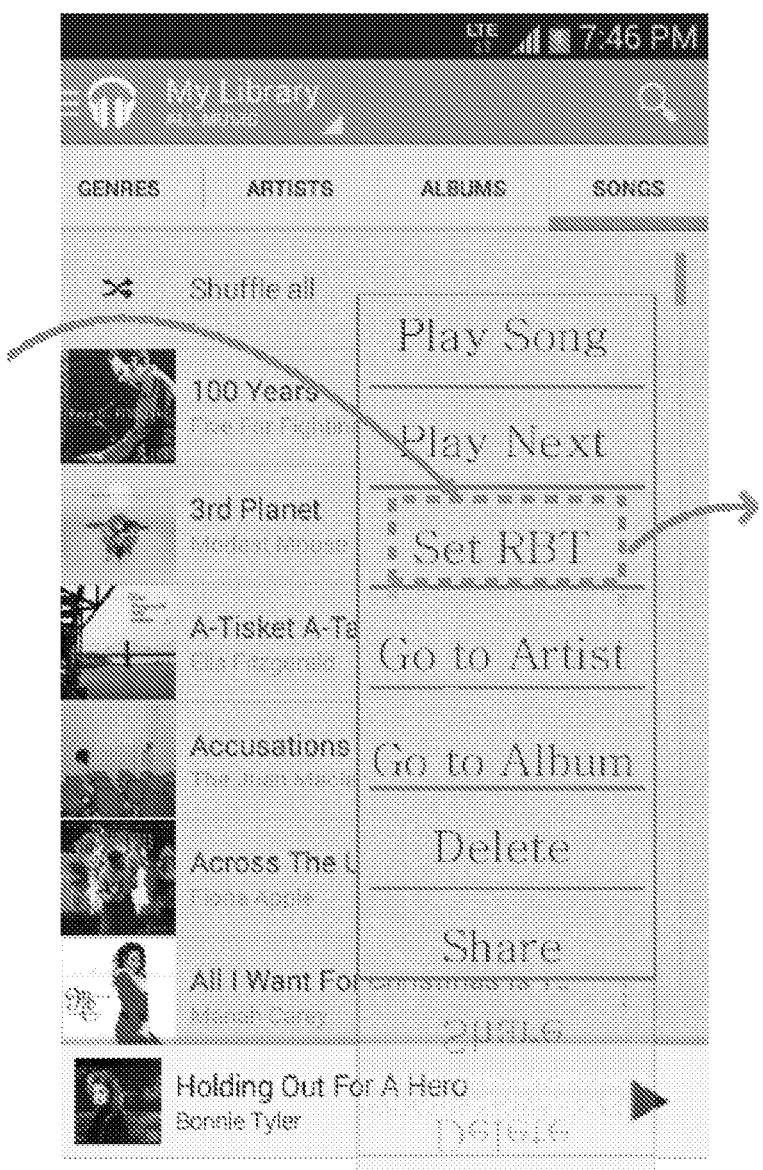
Figure 5C:
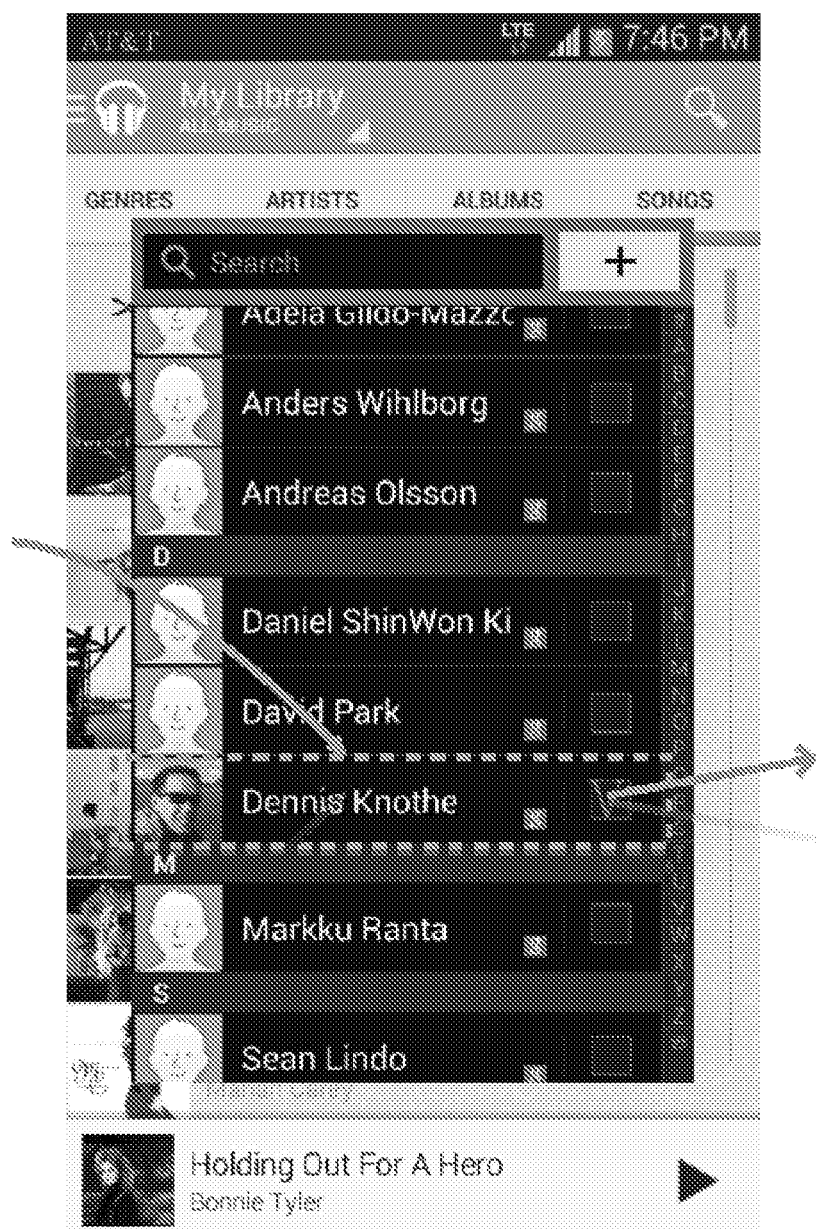
Figure 5D:
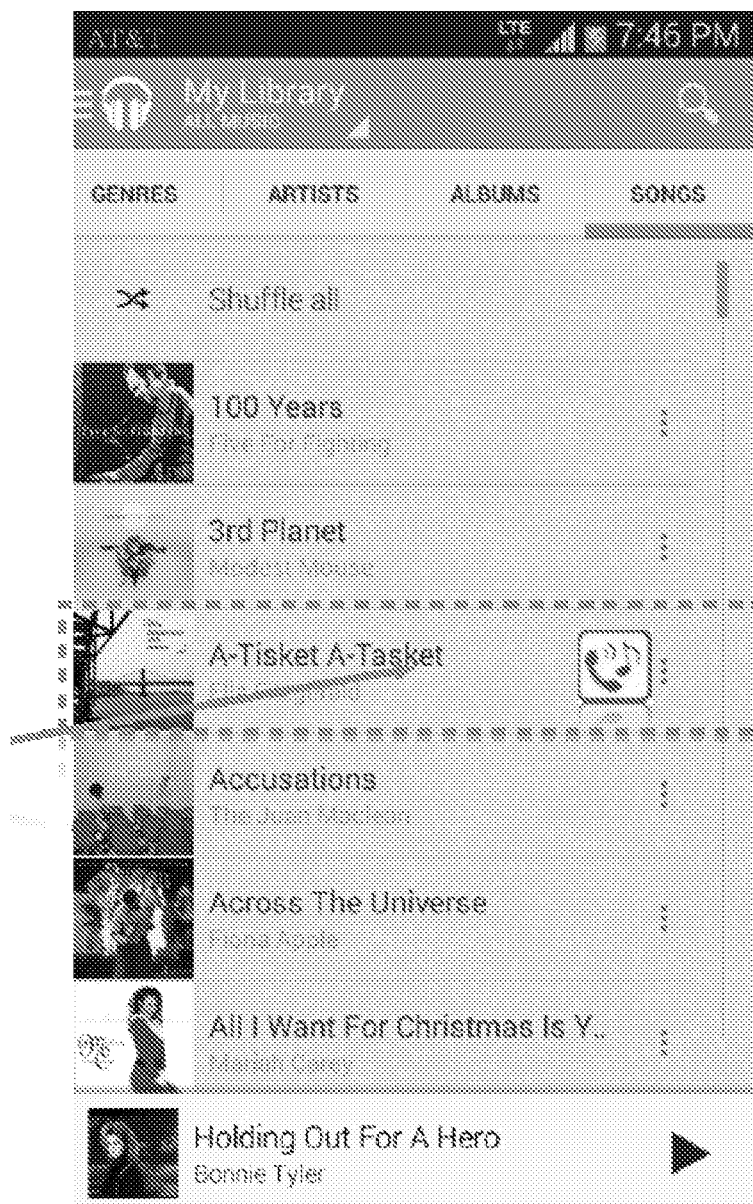

In FIG. 5A, when the terminal 1 selects a song called 'A-Tisket, A-Tasket', a menu pops up as illustrated in FIG. 5B. When 'Set RBT' indicating 'set to a ring-back tone' is pressed in this menu, a screen for enabling the user to select a target user pops up as illustrated in FIG. 5C. At this time, when Dennis Knothe is set to the target user, the corresponding song is used as a ring-back tone in case where Dennis Knothe makes a call to the terminal 1. FIG. 5D shows that the corresponding song was set to the ring-back tone. This process may require an agreement of Dennis Knothe. Otherwise, when Dennis Knothe makes a call to the terminal 1, Dennis Knothe may hear undesired music. The process for the agreement may be performed by sending a push message to the terminal of Dennis Knothe, as described above.

Figure 6:
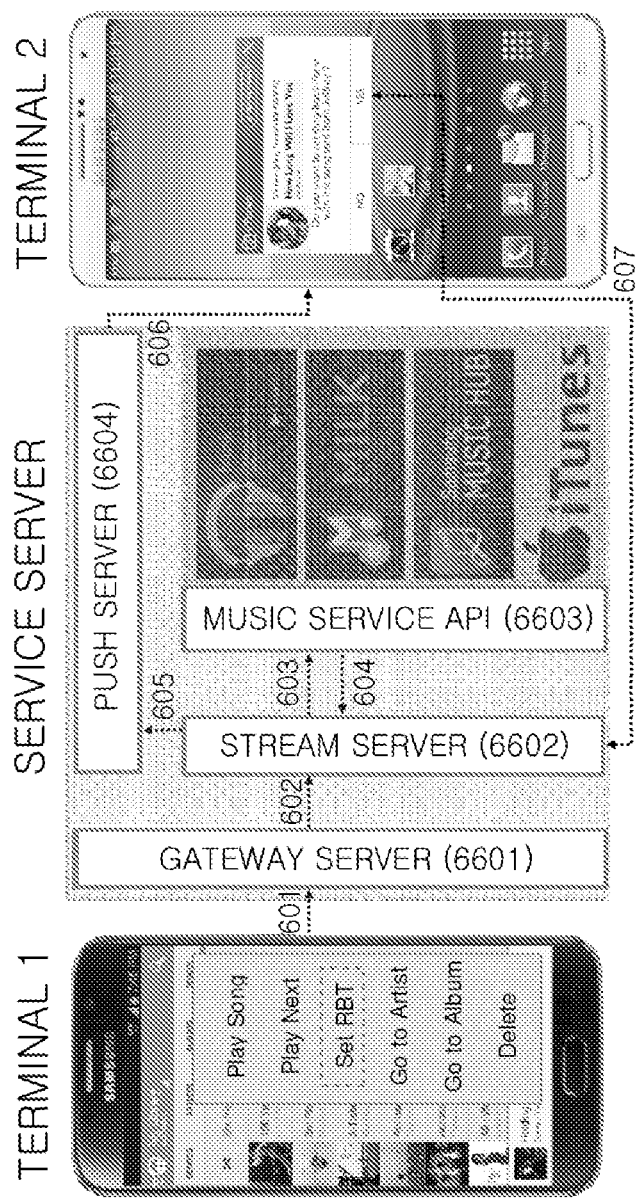
FIG. 6 illustrates a process of setting a ring-back tone between two terminals.

FIG. 6 illustrates a process of setting a ring-back tone between two terminals.

Hereafter, a process of setting a ring-back tone between the terminals 1 and 2 will be described.

FIG. 6 illustrates a first wireless communication terminal 1, a second wireless communication terminal 2 and a service server 3.

The service server 3 includes a gateway server 6601, a stream server 6602 and a push server 6604. Depending on a situation, the service server 3 may include a music service API 6603. The music service API 6603 may be in alliance with an existing service (for example, Apple iTunes).

Although the respective servers are conceptually illustrated, the servers may be integrated as one server, or each of the servers may separately exist. For example, the servers 6601 and 6602 may be physically integrated as one server, and the server 6604 may be configured as a separate server. The servers may be combined in a different manner.

The music service API 6603 may be in alliance with external sound source providers, or correspond to a data server which is included in the service according to the present embodiment.

Step 601: the terminal 1 requests the service according to the present embodiment to set a ring-back tone for the terminal 2.

Step 602: the gateway (GW) server of the service according to the present embodiment requests URL information on music stream data.

Step 603: the service server requests music information using the music service API (for example, Music Hub of Samsung, Milk Music of Samsung, Apple iTunes, Google Music and the like).

Step 604: the service server acquires the music information, and stores the acquired music information in the stream server of the service according to the present embodiment.

Step 605: the service server requests a push message for the terminal 2. The push message includes the URL of the music stream data.

Step 606: a push message window (push pup-up) is displayed on the terminal 2. At this time, the service server checks whether the terminal 2 will download the music stream data. The screen may be provided as illustrated in FIG. 4.

Step 607: the service server requests the terminal 2 to download the music stream data from the stream server of the service according to the present embodiment.

Then, when the terminal 2 makes a call to the terminal 1, the service according to the present embodiment is started.

Figure 7:
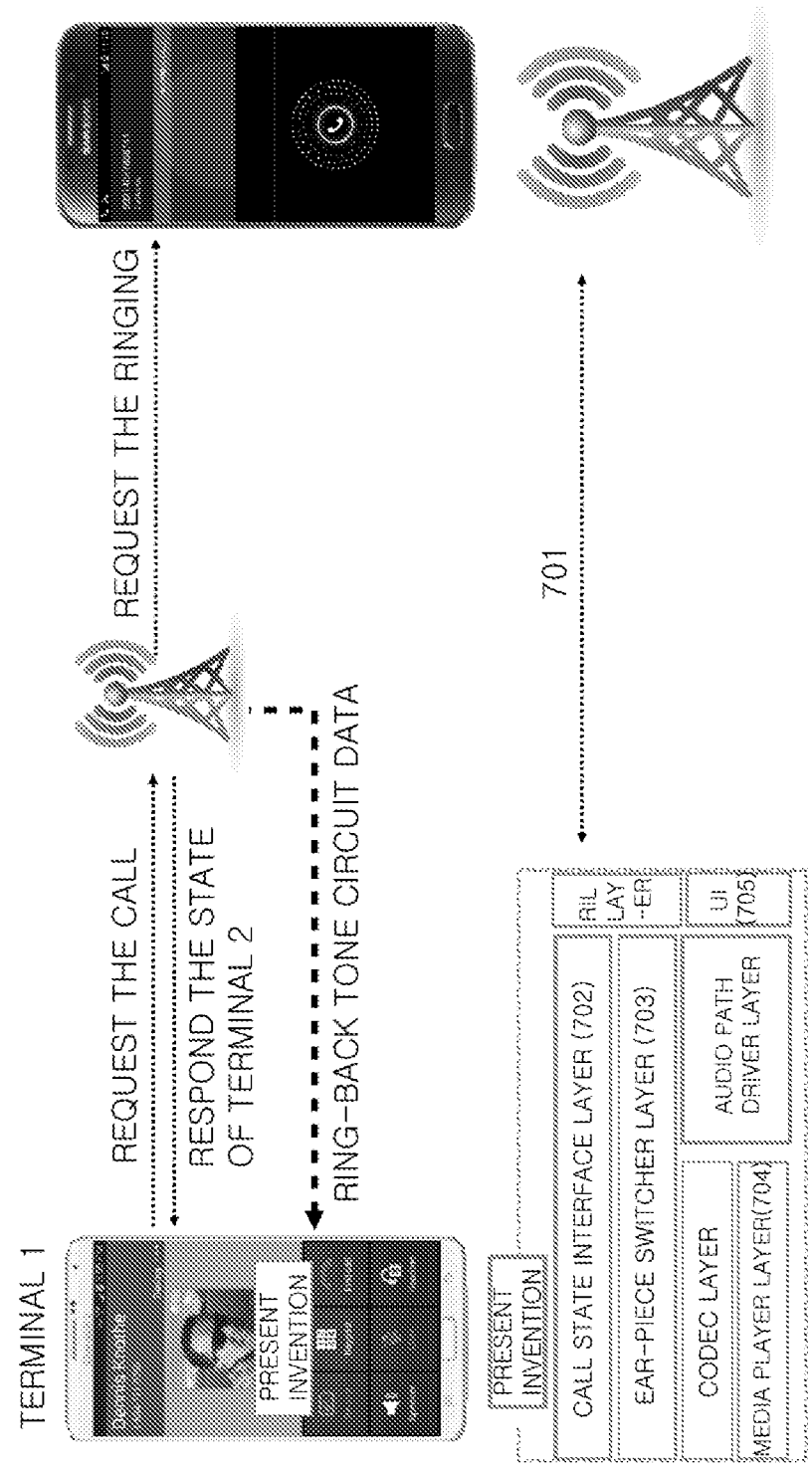
FIG. 7 is a diagram for describing an operation which is performed in a terminal making a phone call.

FIG. 7 is a diagram for describing an operation which is performed in a terminal making a call.

FIG. 7 exemplifies a situation when the terminal 2 makes a call to the terminal 1 of Dennis Knothe.

Step 701: the terminal 2 checks the state of the terminal 1 (call drop, power-off, whether a ring-back tone is already set or whether the state of the terminal 1 is normal).

Step 702: when the state of the terminal 1 is normal, the terminal 2 orders a switcher to switch an audio source. If the terminal 1 has subscribed to a conventional coloring (ring-back tone) service, the corresponding ring-back tone circuit data may be transmitted to the terminal 1 from a relay. However, when the audio source is changed, the conventional ring-back tone may be bypassed and ignored.

Step 703: the terminal 1 requests the switcher to switch over from a vocoder to an internal player.

Step 704: the terminal 1 plays a sound source of the service according to the present embodiment through the ear-piece speaker connected to the internal player.

Step 705: an UI (User Interface) displays a pop-up window indicating the information of the currently played music.

The pop-up window displayed at step 705 may be configured to disappear to a side with an animation effect after a few seconds, for example (refer to FIGS. 8B and 8C described later). Even after the music information pop-up window disappears, the music is continuously played until the call is connected. Then, when the call is connected, the music is stopped, and a conversation with the counterpart is started.

FIGS. 8A to 8D exemplify that the terminal 2 makes a call to the terminal 1.

Suppose that a ring-back tone was set through a push message sent to the terminal 2 from the terminal 1 owned by Dennis Knothe. Then, when the owner of the terminal 2 makes a call to the terminal 1, the set ring-back tone is played.

Figure 8A:
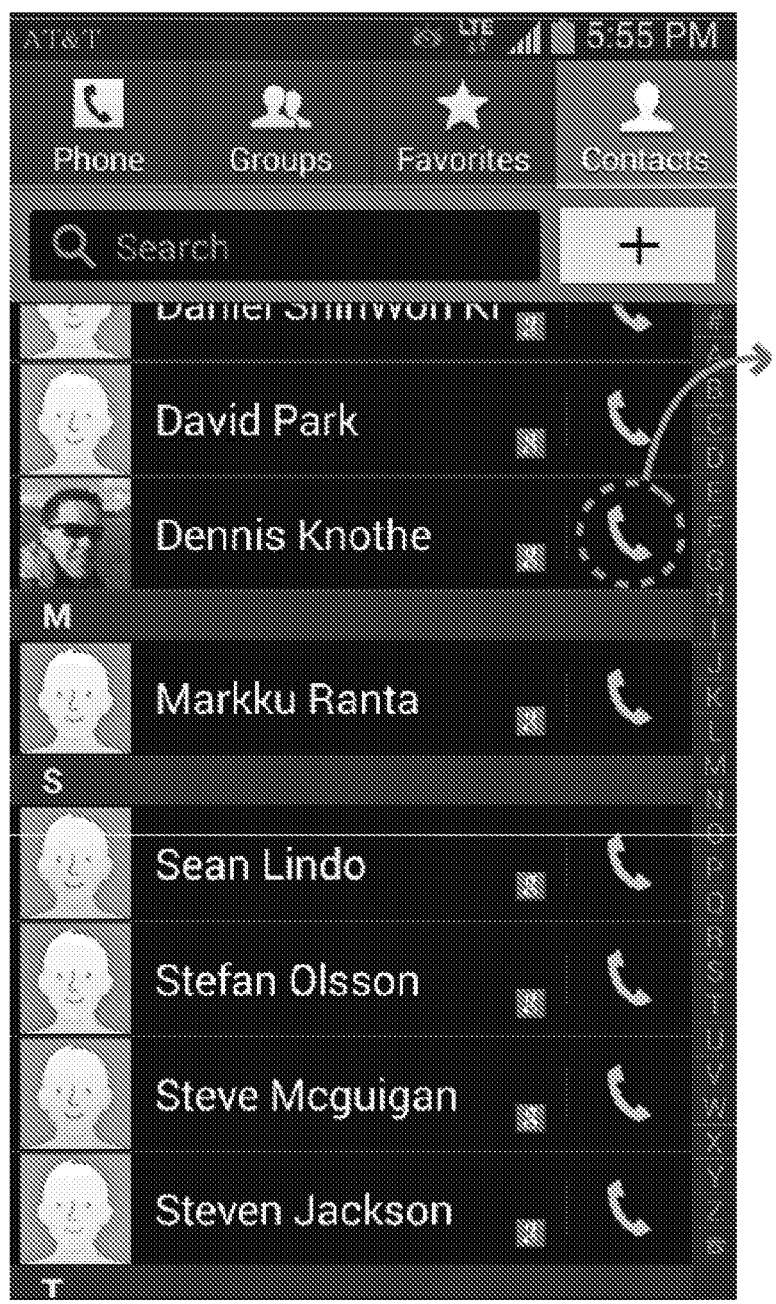
FIGS. 8A to 8D are diagrams for describing a case in which a terminal 2 makes a call to a terminal 1.
Figure 8B:
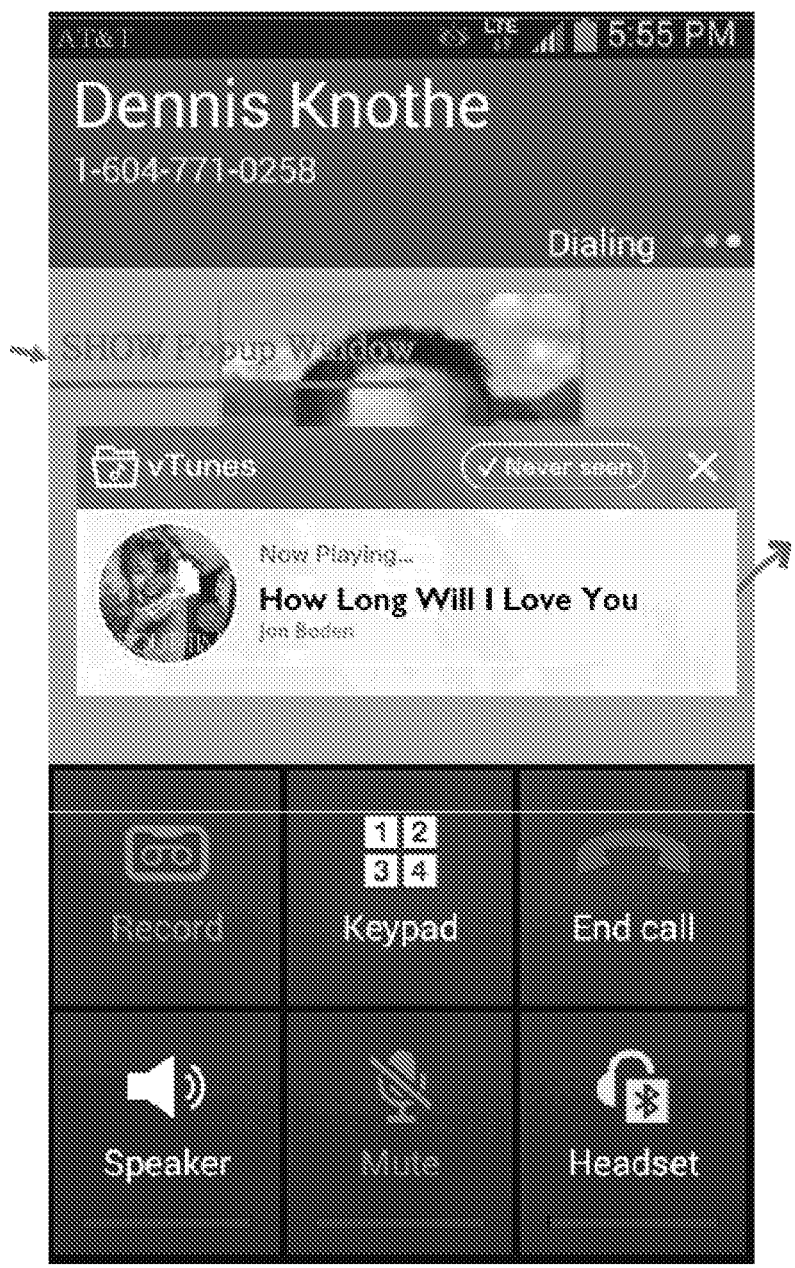
Figure 8C:
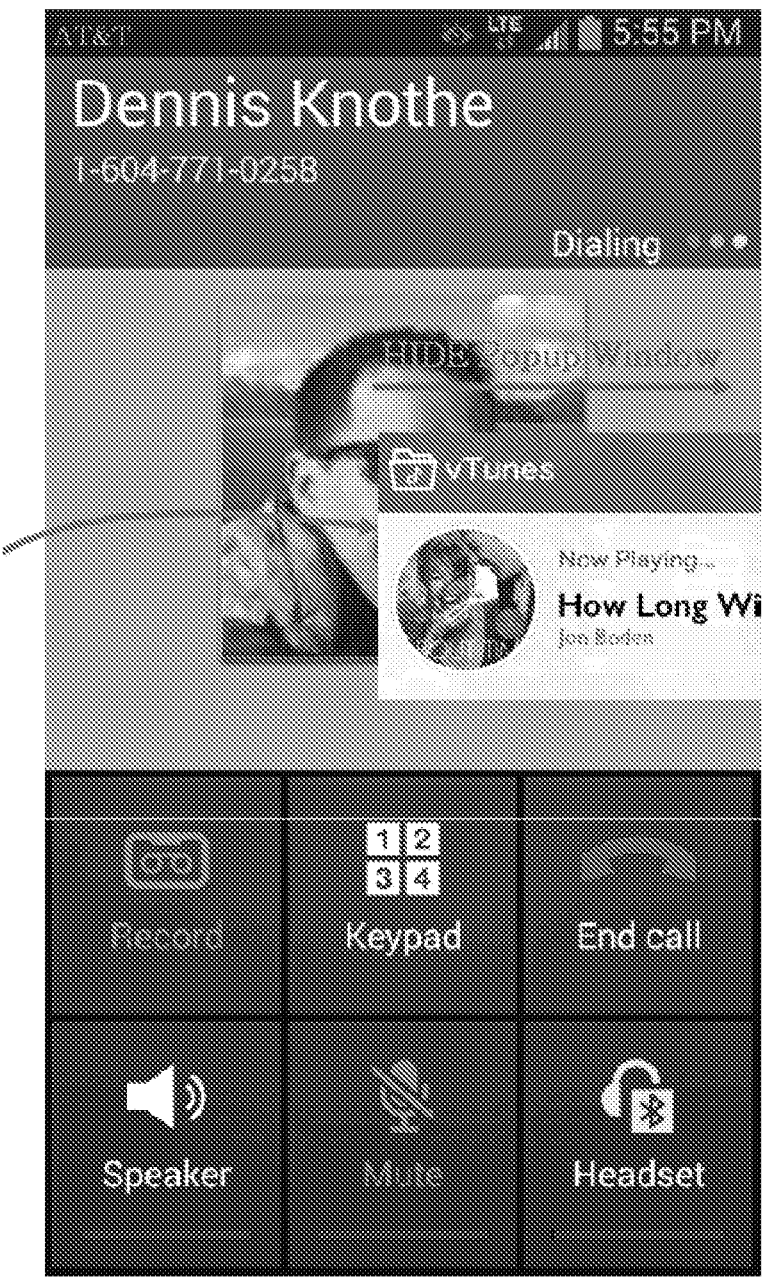
Figure 8D:
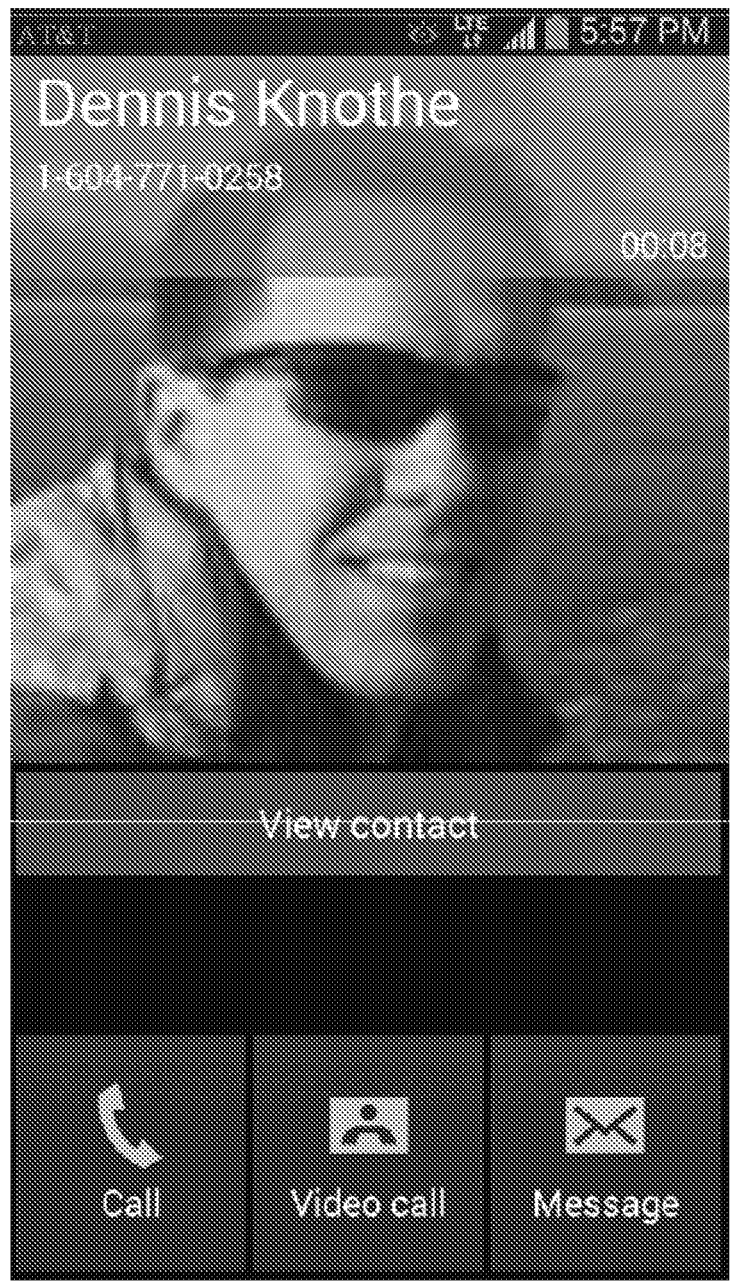

That is, when the owner of the terminal 2 makes a call to Dennis Knothe as illustrated in FIG. 8A, the service according to the present embodiment is started, and a preset sound source of "How long will I love you" is played as illustrated in FIG. 8B. As described above, the music is played through the ear-piece speaker, and a pop-up window for the information on the music is displayed. After a few seconds, the pop-up window disappears. At this time, a visual effect may be added. For example, the pop-up window may gradually disappear with an animation effect, or disappear while being slid to the right as illustrated in FIG. 8C. The music is continuously played until the call is connected. Then, when the call is connected, the service according to the embodiment of the invention is ended, and a conversation with Dennis Knothe is started (FIG. 8D).

Although various embodiments have been described for illustrative purposes, the present invention will not be limited by the above-described embodiments, and it will be apparent to those skilled in the art that various changes and modifications may be made without departing from the spirit and scope of the invention as defined in the following claims. As long as the changes and modifications do not depart from the sprit and scope of the invention, it should be understood that the changes and modifications belong to the scope of the invention.

The above-described embodiments have been focused on the configuration in which the terminal 1 selects a predetermined song (in connection with the service server according to the present embodiment) and a push message is displayed on the terminal 2, the push message including a link through which the corresponding song can be downloaded (for example, 'Yes' button in the question of FIG. 4).

According to another embodiment, however, information on a song stored in the terminal 1 may be extracted and transmitted to the service server according to the embodiment of the invention, and a song coinciding with the information may be transmitted to the terminal 2 from the service server (or another music API server connected to the service server). The information may include song information such as ID2 and ID3 tags, for example, the artist name, title, alum title and release year of the corresponding song. In this case, the user of the terminal 1 may directly transmit the same song as the song owned by the user to the user of terminal 2, without accessing the song list of the service server according to the present embodiment. Specifically, the sound source data of the song stored in the terminal 1 is not directly transmitted to the terminal 2, but the service server checks whether a sound source corresponding to the song exists in the service server or another music API server connected to the service server, based on only the information on the song stored in the terminal 1, such that the sound source data can be transmitted to the terminal 2 from the service server through a link of a push message. Thus, no copyright-related problems occur, and a song can be conveniently selected. For example, the user of the terminal 1 may pay a copyright fee or other fees to the service server (or the music API server connected to the service server) through electronic payments or service coupons, or the service server may separately bear the cost.

However, when a sound source stored in the terminal 1 has nothing to do with a copyright (for example, a sound source which is personally created by the user of the terminal 1), a link through which the sound source is directly transmitted to the user of the terminal 2 may be provided. In order to solve a copyright problem, the service server according to the present embodiment may determine whether the corresponding song has a copyright. At this time, a variety of methods may be applied to determine whether a song has a copy right. For example, the service server may determine whether the same sound source as a sound source selected by the terminal 1 exists in the service server or the music API server connected to the service server, based on the music information on the selected sound source.

REFERENCE SIGNS LIST

1: first wireless communication terminal
2: second wireless communication terminal
3: service server
6601: gateway server
6602: stream server
6603: music service API
6604: push server

The invention claimed is:

1. A ring-back tone setting method for setting in advance a ring-back tone which is to be played while a second wireless communication terminal attempts to make a call to a first wireless communication terminal, the ring-back tone setting method comprising the steps of:
  (1) selecting, by the first wireless communication terminal, a sound source to be used as a ring-back tone, and selecting the second wireless communication terminal in which the sound source is to be set;
  (2) transmitting a message, which includes the sound source or includes a URL through which the sound source is downloaded, to the second wireless communication terminal according to a request of the first wireless communication terminal;
  (3) displaying the message on a screen of the second wireless communication terminal together with an inquiry of accepting the message or not;
  (4) if the inquiry regarding the message is accepted, downloading, by the second wireless communication terminal, the sound source contained in the message, or downloading the sound source from a predetermined server connected to the second wireless communication terminal through the URL;
  (5) setting, by the second wireless communication terminal, the downloaded sound source to a ring-back tone which is to be played while the second wireless communication terminal attempts to make a call to the first wireless communication terminal; and
  (6) attempting, by the second wireless communication terminal, to make the call to the first wireless communication terminal, wherein the sound source which is set in advance as the ring-back tone in the steps (1)-(5) is to be played while the second wireless communication attempts to make the call to the first wireless communication.

2. The ring-back tone setting method according to claim 1, wherein in the step (2),
  the message contains the title of the sound source and information indicating the message created by a request from the first wireless communication terminal, and includes one of an SMS (Short Message Service) text, an MMS (Multimedia Message Service) text and a push message.

3. The ring-back tone setting method according to claim 1, wherein the step (4) includes asking a user of the second wireless communication terminal whether the user allows the downloading, before the second wireless communication terminal downloads the sound source.

4. The ring-back tone setting method according to claim 1, wherein in the step (1),
  the sound source includes contents stored in the first wireless communication terminal or a sound source selected from a ring-back tone list server.

5. The ring-back tone setting method according to claim 4, wherein in the step (1),
  when the contents stored in the first wireless communication terminal are selected as the sound sources to be used as the ring-back tone, the contents are not directly transmitted to the second wireless communication terminal, but sound source information of the contents stored in the first wireless communication terminal is extracted to check whether a sound source coinciding with the sound source information exists in the ring-back tone list server or a server connected to the ring-back tone list server, and the contents are transmitted to the second wireless communication terminal from the ring-back tone list server or the connected server in case where the sound source exists.

6. The ring-back tone setting method according to claim 5, wherein the sound source information contains the artist name and the title of a song.

7. A ring-back tone service system which is used for executing the method according to claim 1, wherein
the ring-back tone service system acquires and stores sound source data of a sound source selected by a first wireless communication terminal, transmits the sound source data to a second wireless communication terminal, and sets the sound source data to a ring-back tone which is used when the second wireless communication terminal makes a call to the first wireless communication terminal.

8. The ring-back tone service system according to claim 7, including:
a gateway server configured to request URL information of a server storing the selected sound source, when the sound source is selected through the ring-back tone list server in the step (1);
a stream server configured to check whether the sound source is a sound source owned by the stream server, or acquire a sound source from another data server, according to a request from the gateway server; and
a push server configured to send a push message to the second wireless communication terminal, the push message containing the URL of the selected sound source within the stream server.

9. The ring-back tone service system according to claim 8, wherein the gateway server, the stream server and the push server are configured as separate servers, or two or more of the gateway server, the stream server and the push server are configured as one server.

10. A ring-back tone playing method in which the second wireless communication terminal having a ring-back tone set through the method of claim 1 plays the ring-back tone while attempting to make a call to the first wireless communication terminal, the ring-back tone playing method comprising the steps of:
when attempting, by the second wireless communication terminal, to make a call to the first wireless communication terminal, checking whether the ring-back tone is set in the second wireless communication terminal;
changing an audio path connected to an ear-piece speaker of the second wireless communication terminal to an audio path passing through a media player or internal codec embedded in the second wireless communication terminal, when it is checked that the ring-back tone is set;
playing sound source data through the ear-piece speaker, the sound source data being stored in the second wireless communication terminal and set to the ring-back tone; and
changing the audio path connected to the ear-piece speaker to an audio path provided by a call relay, when the call to the first wireless communication terminal is connected.

11. The ring-back tone playing method according to claim 10, wherein the step of playing the sound source data stored in the second wireless communication terminal and set to the ring-back tone through the ear-piece speaker includes decoding and playing the sound source data stored in the second wireless communication terminal through a DSP (Digital Signal Processor).

12. The ring-back tone playing method according to claim 10, further comprising the step of:
checking whether the second wireless communication terminal is a coloring service subscriber of a mobile carrier, while checking whether the ring-back tone is set in the second wireless communication terminal;
changing the audio path regardless of whether the second wireless communication terminal is a coloring service subscriber when the ring-back tone has priority according to order of priority set in advance in the second wireless communication terminal; and
using the coloring service of the mobile carrier when the coloring service of the mobile carrier has priority according to the order of priority set in advance in the second wireless communication terminal.

* * * * *